United States Patent
Lengning et al.

(10) Patent No.: US 8,207,837 B2
(45) Date of Patent: Jun. 26, 2012

(54) PROCESS AND APPARATUS FOR THE OUTPUT OF MUSIC INFORMATION IN A VEHICLE

(75) Inventors: Marc Lengning, Munich (DE); Bernhard Schambeck, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1464 days.

(21) Appl. No.: 11/076,255

(22) Filed: Mar. 10, 2005

(65) Prior Publication Data

US 2005/0212667 A1    Sep. 29, 2005

Related U.S. Application Data

(60) Provisional application No. 60/551,795, filed on Mar. 11, 2004.

(51) Int. Cl.
    *B60Q 1/00*    (2006.01)
(52) U.S. Cl. ........ 340/439; 340/575; 340/576; 702/182; 702/183; 702/188

(58) Field of Classification Search .................. 340/439, 340/575, 576; 702/182, 183, 188
See application file for complete search history.

(56) References Cited

U.S. PATENT DOCUMENTS

| | | | | |
|---|---|---|---|---|
| 5,150,609 A | * | 9/1992 | Ebner et al. | 73/117.3 |
| 5,465,079 A | * | 11/1995 | Bouchard et al. | 340/576 |
| 6,239,707 B1 | * | 5/2001 | Park | 340/576 |
| 2005/0143884 A1 | * | 6/2005 | Bihler et al. | 701/36 |

FOREIGN PATENT DOCUMENTS

DE    101 53 987 A1    5/2003

* cited by examiner

*Primary Examiner* — Tai T Nguyen
(74) *Attorney, Agent, or Firm* — Crowell & Moring LLP

(57) ABSTRACT

In the case of a process for the output of music information via an audio device in a vehicle, in which the driver's behavior is determined on the basis of data of one or more driving systems and/or of one or more comfort systems of the vehicle, one piece of music respectively is stored as music information in a table for different behaviors of the driver and/or traffic situations. When the respective driving behavior and/or the respective traffic situation exists, this music information is played back by way of the audio device.

3 Claims, 2 Drawing Sheets

PROCESS AND APPARATUS FOR THE OUTPUT OF MUSIC INFORMATION IN A VEHICLE

CROSS REFERENCE

The present application claims the benefit of priority under 35 U.S.C. §119 to U.S. Provisional Patent Application No. 60/551,795, filed Mar. 11, 2004. The application is related to U.S. Applications entitled PROCESS FOR THE OUTPUT OF INFORMATION IN A VEHICLE filed on even date herewith.

BACKGROUND AND SUMMARY OF THE INVENTION

The invention relates to a process for the output of music information in a vehicle through the use of an audio device in which the drives behavior is determined on the basis of data of one or more driving system and/or one or more comfort systems of the vehicle.

A process of the above mentioned type is known from German Patent Document DE 101 53 987 A1, the content of which is incorporated by reference therein. In this case, music information is emitted together with speech information by an entertainment part of an electronic system. This is obviously information as it is emitted from a commercially available car radio and which is not at all connected with the respective driving situation.

In contrast, it is an aspect of the invention to improve the useful value of the information output for the driver.

The invention provides a process for the output of music information via an audio device in a vehicle, in which the driver's behavior is determined on the basis of data of one or more driving systems and/or one or more comfort systems of the vehicle. One piece of music respectively is stored as music information in a table for different behaviors of the driver and/or traffic situations and, when the respective driving behavior and/or the respective traffic situation exists, this music information is played back by way of the audio device.

In one aspect of the invention, the driver is provided with assistance for his further action which is not directly noticeable. For this purpose, a piece of music is played as a function of the driver's driving behavior and driving situation, the musical characteristics of the piece of music contributing to increasing the driver's awareness or state and, thus to increasing his driving safety.

The driving behavior and the driving situation are determined on the basis of data of one or more driving systems and/or of one or more comfort systems of the vehicle. Data relevant to the driver's condition and driver's behavior, which already exist in the vehicle, are analyzed, and the selection of the pieces of music is controlled as a function of these data. The pieces of music are correspondingly taken from a table in which one piece of music respectively is stored for the essential driving data.

The following is an example illustrating the basic idea of the invention:

It is assumed that the driver is driving in good weather in a recognizably relaxed state along a moderately curved country road at an appropriate and constant speed. The state of the driver is indicated, for example, on the basis of the amplitudes, the speed and the changes of speed of his steering movements. In such a case, a "vibrant" piece of music is played at an easily audible volume.

A different situation, however, exists during a drive in which the driver moves recognizably hectically in dense traffic, which threatens to result in a traffic jam. In contrast to the above-considered case, his steering movements are significantly unsteady and the vehicle speed is subjected to significant changes. In such a state, a "calm" music is played at a low volume.

In both cases, the music information has the purpose of improving the driver's mood or state and, thus, contributing to increase traffic safety. This is based on the thought that drivers who are relaxed and who are concentrating are clearly involved in fewer accidents.

When there is a clear change in the traffic situation, it may be advantageous to interrupt the piece of music currently being played and to immediately change over to the piece of music which corresponds to, or "fits", the existing traffic situation. This case occurs, for example, when the driver turns from a side street used only by him into a main street with dense traffic. The music information assists the driver continuously and always in an optimized form during his driving activity.

This also demonstrates the value of the currently effective music information. It thereby becomes possible to assist the driver without simultaneously forcing him to act. This indicates the difference with respect to the acoustic or visual information which is emitted in the case of a navigation system. There, the information is emitted as a function of the route covered by then. In addition, it is expected by the driver. The music information is a true help, which the driver frequently does not perceive directly, whereas the navigation system emits a concrete instruction to take a certain route.

Advantageous developments and further developments of the invention are described and claimed herein. They can be assigned to different scenarios during the use of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
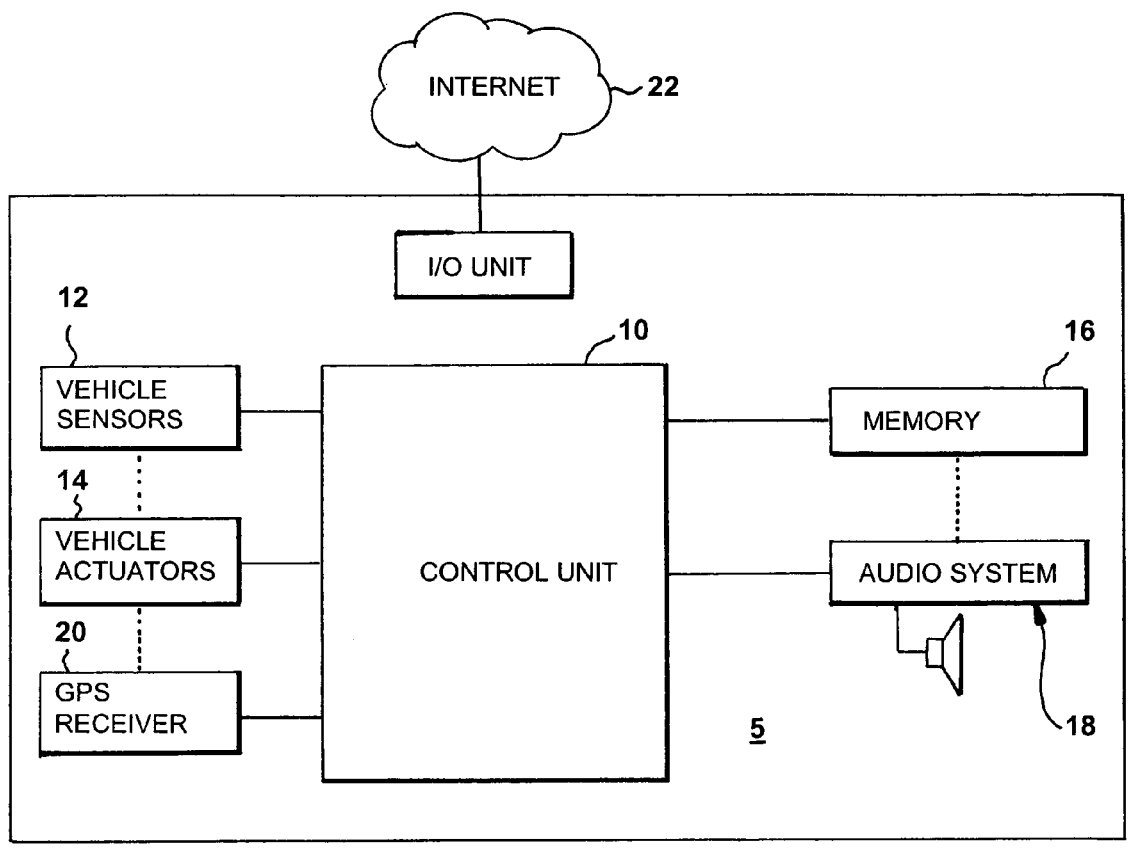
FIG. 1 is a schematic block diagram of an apparatus for the output of music information in a vehicle in accordance with the present invention.

A technical implementation of the invention for an acoustic information output takes place as follows with reference to FIG. 1.

An assigned control unit 10 analyzes the respective driving situation and the driver's behavior by means of the information of the vehicle sensors 10 and actuators 14, which information is situated on the database inside the vehicle 5. In a table 16, pieces of music are assigned to various concrete driving situations, which pieces of music are played by the audio system 18 in correspondence with the driving situation. If the driving situation is maintained, the piece of music may possibly be repeated several times with a pause in-between. If the driving situation changes, the control unit will react immediately and the piece of music applicable then will be emitted instead of the piece of music just played.

Figure 2:
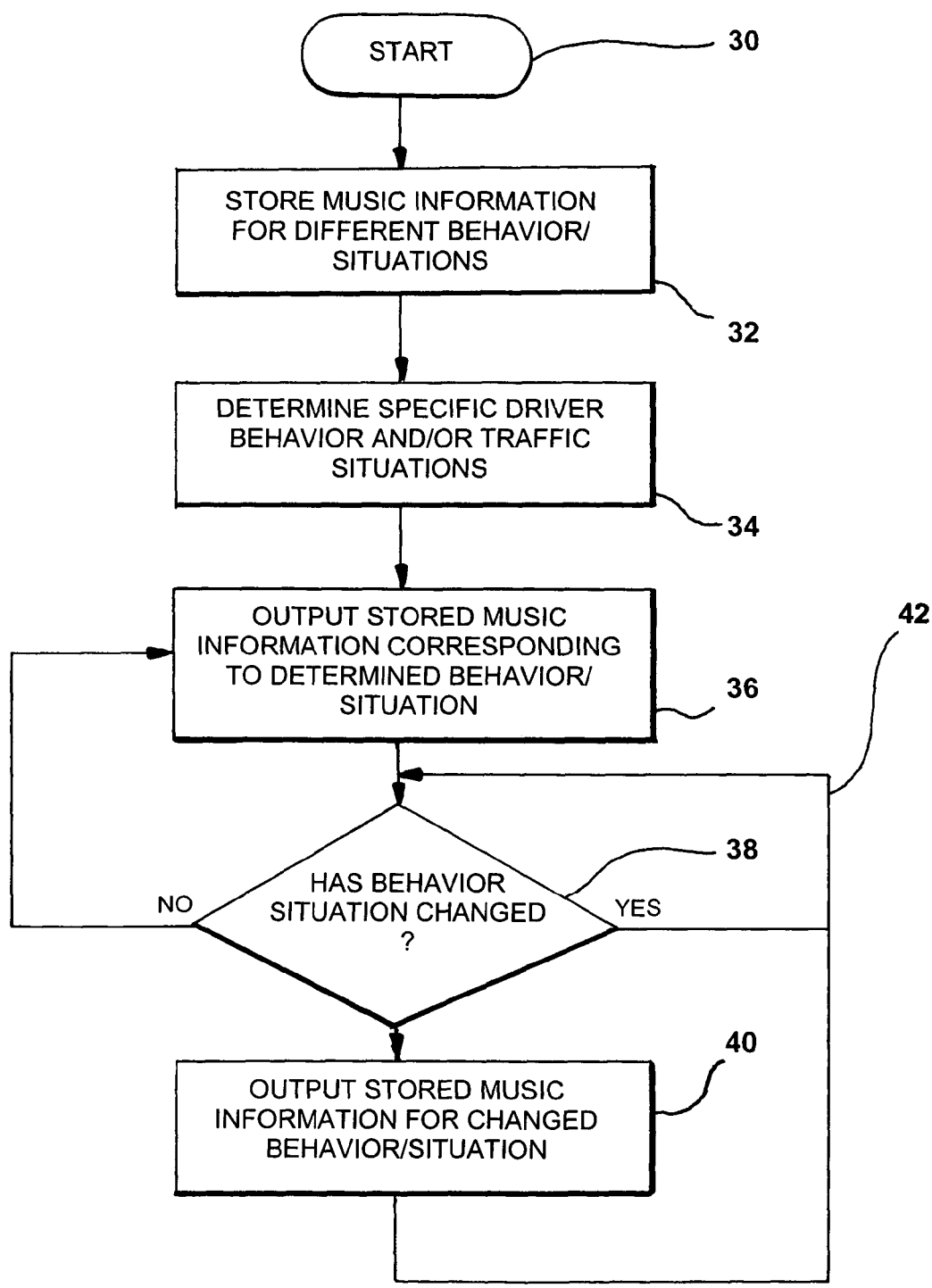
FIG. 2 is a flowchart illustrating and exemplary process for the output of music information in a vehicle in accordance with the present invention.

FIG. 2 provides an exemplary illustration of the process flow in accordance with the present invention. Starting at step 30, the process stores music information in a table for different behaviors of the driver and/or traffic situations at step 32.

The process then determines the specific driver behavior and/or traffic situation at step 34. Then, at step 36, the stored music information corresponding to the determined behavior and/or traffic situation is output via the audio system in the vehicle. At step 38, it is determined whether the driving behavior and/or traffic situation has changed. If not, the process loops back to step 36 and continues to output the stirred music in accordance with the existing behavior and/or situation. In this loop, the piece of music may possibly be repeated several times, including possibly with a pause in between each replay. However, if it determined that the driving behavior and/or traffic situation has changed, then the process outputs the stored music information corresponding to the changed driving behavior and/or situation at step 40. Throughout the drive, the process loops back as illustrated via line 32 to determine whether the driving behavior and/or traffic situation has again changed.

The data, including possible GPS information 20, stored on the database, can be used as input data of the system. The system can be configurable; the contents (audio files) are stored, as mentioned above, in the vehicle by way of a memory medium (memory card, hard disc, or the like). However, it is also contemplated to download the contents via the Internet 22 or purchase them at a vehicle dealer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for outputting music information in a vehicle to a driver, the processing comprising the acts of:
    storing one piece of music, respectively, as music information in a table for different behaviors of the driver and/or traffic situations, wherein the music information has musical characteristics that improve a mood or state of the driver;
    determining a driver's behavior based on data from at least one of one or more driving systems and comfort systems of the vehicle;
    playing back via an audio device in the vehicle, the one piece of music respectively stored as music information for a correspondingly determined driver behavior and/or an existing traffic situation; and
    determining if the driver's behavior and/or existing traffic has changed; and, if so, playing back via the audio device in the vehicle, the one piece of music respectively stored as music information correspondingly to the determined changed driver behavior and/or existing traffic situation.

2. The process according to claim 1, wherein when the respective driving behavior and/or traffic situation changes, the process immediately interrupts the one piece of music currently being played and then plays back music corresponding to music information provided in the table for the changed behavior and/or situation.

3. A process for outputting music information, comprising the acts of:
    storing one piece of music, respectively, as music information in a table for different human behaviors and/or situations, wherein the music information has musical characteristics that improve a mood or state of the driver;
    determining human behavior based on data from one or more information systems of a moving object;
    playing back via an audio device, the piece of music respectively stored for a correspondingly determined human behavior; and
    determining if the human behavior has changed; and, if so, playing back via the audio device, the piece of music respectively stored for the determined changed human behavior.

* * * * *